United States Patent [19]

Goldman

[11] 4,146,416

[45] Mar. 27, 1979

[54] APPARATUS FOR VIBRATION WELDING OF MATERIAL

[75] Inventor: Herbert S. Goldman, New York, N.Y.

[73] Assignee: Crompton & Knowles Corporation, Parsippany, N.J.

[21] Appl. No.: 851,575

[22] Filed: Nov. 14, 1977

[51] Int. Cl.² .............................................. B29C 27/08
[52] U.S. Cl. .................................................. 156/580.1
[58] Field of Search ................ 156/580.1, 580.2, 73.1, 156/73.2, 73.3, 73.4

[56] References Cited

U.S. PATENT DOCUMENTS

| 3,733,238 | 5/1973 | Long et al. | 156/580.1 |
| 3,844,869 | 10/1974 | Rust | 156/73.1 |
| 3,904,457 | 9/1975 | Laughlin | 156/73.4 |
| 4,070,217 | 1/1978 | Smith et al. | 156/73.2 |

FOREIGN PATENT DOCUMENTS 2259203  12/1972  Fed. Rep. of Germany ........ 156/580.1

Primary Examiner—Douglas J. Drummond

[57] ABSTRACT

This invention is in an apparatus for vibration welding of material comprising a plurality of vibration sources, anvil means cooperating with these sources and means for transporting material through the cooperating vibration sources and anvil means. The improvement which comprises this invention is the arrangement of vibration sources in a linear array with the ends of the sources overlapping adjacent sources in the direction of the movement of the material.

2 Claims, 9 Drawing Figures

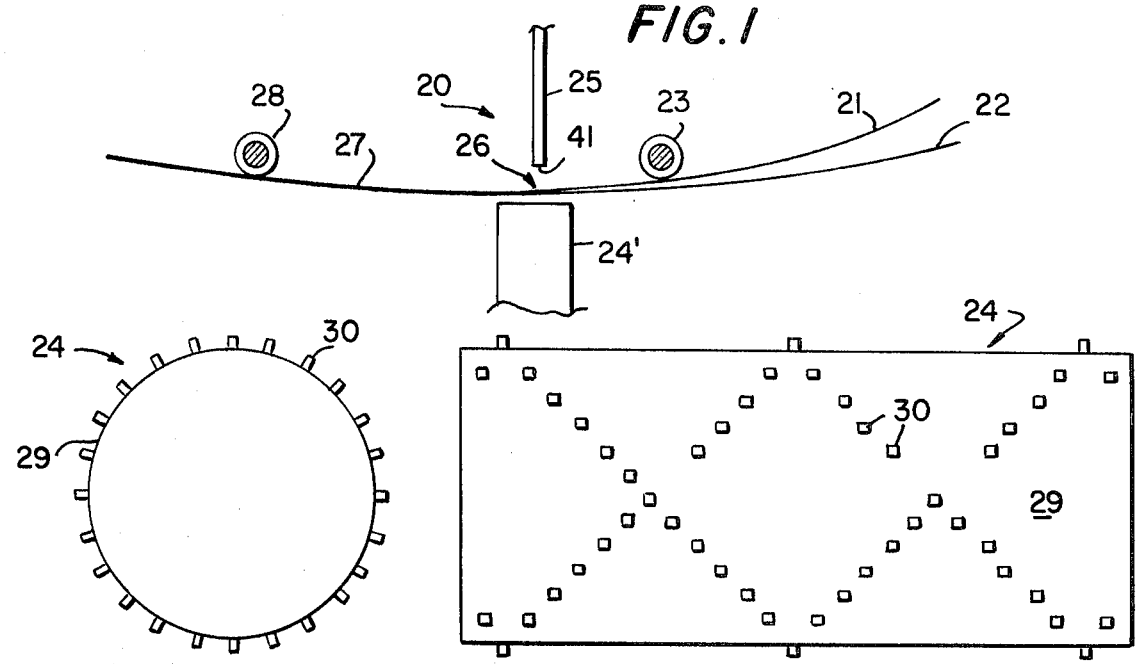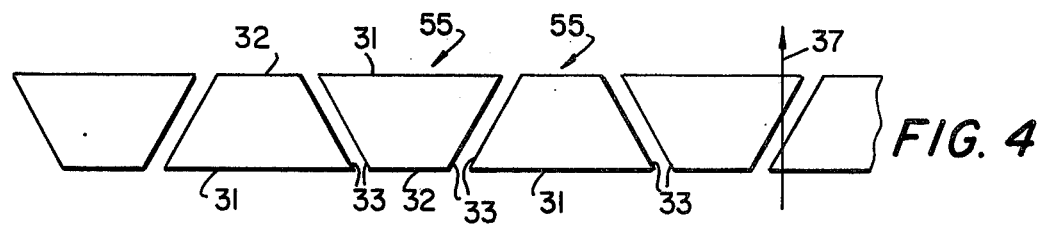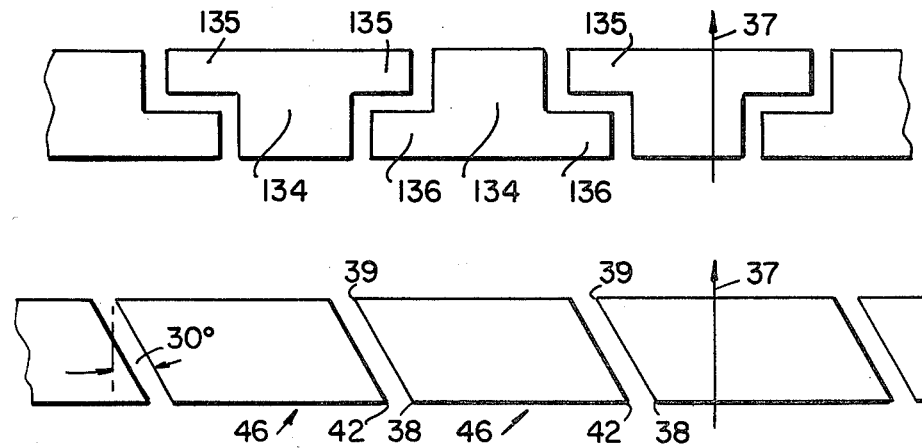

APPARATUS FOR VIBRATION WELDING OF MATERIAL

BACKGROUND AND PRIOR ART

The apparatus of this invention is designed to weld together layers of material instead of sewing them. Apparatus used to vibration weld (preferably by ultrasonics) a line on materials are common and old as are apparatus designed to ultrasonically weld a design onto the materials while they are being welded together. Attention is directed towards Long et al. U.S. Pat. No 3,733,238 and to Carpenter U.S. Pat. No. 3,649,786 which are incorporated herein by reference. Long's patent explains in great detail the need to have an ultrasonic welding apparatus designed to weld the whole width of materials passed through the apparatus. The problem Long encountered was that one could not design a ultrasonic source the whole width of the material and, in addition, one cannot have the sources in contact with each other as opposing vibrations would ruin them (Long Column 1, Lines 62-6). Yet, Long also states that if the sources are spaced to avoid contact with each other the pattern would be seriously limited as the welds would not cover the entire width of the material and thus, unwelded "lines" would appear in the finished product (Long Column 1, Lines 62-6). Long in his invention creates two rows of sources with the second row having its sources placed in the gaps of the first row; thereby the second row is adapted to weld the "lines" left unwelded by the first row of sources.

SUMMARY OF THE INVENTION

This invention comprises an apparatus for vibration welding preferably by ultrasonics of material comprising a plurality of vibration sources, anvil means cooperating with these sources and means for carrying material to the cooperating sources and anvil means. The improvement which comprises this invention is the arrangement of the sources in a linear array with the ends of the sources overlapping adjacent sources in the direction of the flow of the material.

The invention can employ vibration sources in the form of trapezoids alternatingly arranged with adjacent long and short ends or can employ sources in the form of parallelograms whose ends are arranged to overlap or can employ sources in the form of rectangles having overlapping extensions that are less than the width of the entire source and which are adapted to overlap adjacent extensions. This is not the entire range of embodiments of the invention but are some of the workable ideas embodying the invention.

It is an object of this invention to provide an apparatus for vibration welding of materials which will weld the entire width of the materials without leaving any gaps of unwelded materials.

How this and other objects of the invention are accomplished is best described in the Detailed Description and in the accompanying drawing in which:

BRIEF DESCRIPTION OF THE DRAWING

FIG. 1 is a side view of a schematic of the apparatus for vibration welding of materials.

FIG. 2 is a side view of an anvil used in the apparatus.

FIG. 3 is a front view of the anvil of FIG. 2.

FIG. 4 shows a top view of the allignment of an array of alternating trapezoidal sources.

FIG. 5 and 6 show top views of different forms of rectangular sources with extension arranged to overlap adjacent extensions.

FIG. 7 shows a top view of an array of parallelogram sources arranged to overlap.

DETAILED DESCRIPTION OF THE INVENTION

Figure 8:
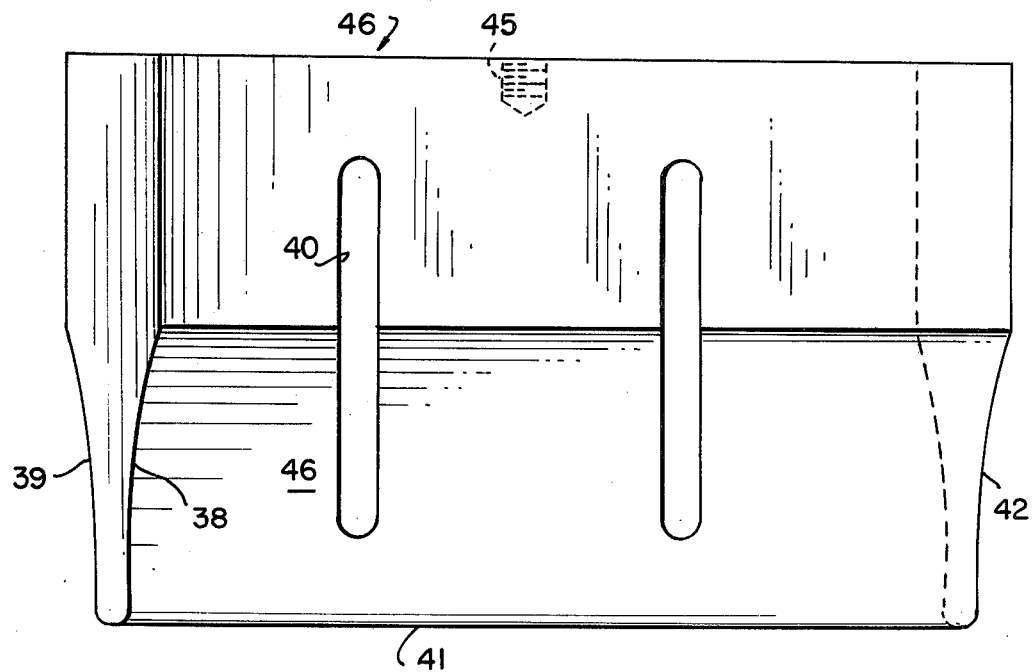
FIG. 8 shows a front view of a parallelogram source of FIG. 7.

FIG. 1 shows an overall schematic view of the apparatus for vibration welding of material 20. Materials such as materials 21 and 22 are fed from rollers (unshown) to roller 23 and from there go to point 26, the point of welding. At the point 26 there are located anvil means 24' and a plurality of vibrational sources, preferably ultrasonic sources 25 and will be better described below. These sources are arranged in an array and cover the entire width of materials 21 and 22. Materials 21 and 22 are welded at point 26 into finished products 27 which goes on around roller 28 to be picked up by further roller (unseen). The rollers 23 and 28 keep materials 21, 22 and 27 taut through point 26 while sources 25 and anvil means 24 perform the welding process. Materials 21 and 22 are preferably of a thermoplastic material or at least partially thermoplastic as is well known in the art.

FIG. 2 and 3 show a preferred embodiment of anvil means 24 in the form of tube 29 with protuberances 30. FIG. 3 shows that protuberances 30 on tube 29 can be arranged in a design. Anvil means 24 is arranged in relation to sources 25 so that the edge of the protuberance 30 is at a proper distance from face 41 of sources 25 in order to create a weld where face 41 and protuberance 30 meet. At this distance tube 29 of anvil means 24 is not close enough to the face 41 of sources 25 to create a weld on materials 21 and 22. Anvil means 24 rotate and aid in the carrying of the materials 21 and 22 through the welding process. In this fashion, the vibration sources 25 only create a weld when they come into contact with protuberances 30 as anvil means 24 rotates by sources 25; welds are thus created in the form of the design of protuberances 30 on tube 29.

The improvement of this invention is the formation of vibration sources 25. It is desired that vibration sources 25 cover the entire width of materials 21 and 22 to be welded. It is not feasable to make a vibration source which runs the entire width of materials 21 and 22. This is more fully explained by Kleesattel et al. U.S. Pat. No. 3,113,225. On the other hand, if the vibration sources 25 are placed together with no gap between them they will vibrate against each other and be ruined. However, if the entire widths of materials 21 and 22 are not covered by the vibration sources 25 there will be lines perpendicular to the movement of the materials 21 and 22 which will not be welded; this will not only affect the bond between the materials 21 and 22, but will also ruin the design created by the protuberances 30 on anvil means 24.

One method suggested to cope with this is to have two rows of vibrations sources with the sources of the second row placed behind the gaps in the sources of the first row. This requires two separate types of attachments for the sources to the apparatus; one for each row. As anvil meams 24 is circular, in the form of a tube 29, the first row of sources would hit anvil means 24 in the direction of a radius of tube 29. If the second row hits anvil means 24 in a direction parallel to that of the first row, the second row will not hit anvil means 24 in the direction of a radius of tube 29. As the second row will not hit tube 29 in one of its radii it will hit protuberance 30 at an angle and the vibrations of the second row could rip some protuberances 30 off tube 29. In order to avoid this the second row need be attached at an angle to the first row, this is another reason for two separate types of attachments for the sources of the first and second rows. The present invention has only a single row of sources 25 with one attachment; however, they are arranged to cover the full width of the materials 21 and 22 to be welded but yet do not contact each other and are thereby not ruined.

FIG. 4 shows an embodiment of this invention. The sources 55 are in the form of alternating trapezoids with adjacent long 31 and short 32 ends. The alternating of the trapezoids allows side edges 33 to be adjacent to each other and to overlap in the direction of arrow 37; arrow 37 shows the direction of materials 21 and 22 through the welding process.

FIG. 5 shows another embodiment of the invention with rectangular sources 34. These rectangular sources 34 have upper extenstions 35 and lower extensions 36. These extensions 35 and 36 do not take up the whole width of the source 34 and are arranged so that the upper extension 35 of one source is overlapping the lower extension 26 of the next source. Again any materials such as materials 21 and 22 traveling in the direction of the arrow 37 past source 34 and anvil means 24 are covered by welds along their entire width with no gaps in the weld caused by gaps in the array of sources.

FIG. 6 shows another embodiment of the rectangular sources 134; however in this embodiment of the rectangular sources are alternating with the first source 134 having two upper extensions 135 and the next rectangular source 134 having two lower extensions 136. The sources 134 are placed together so that the upper extension 135 of one source 134 covers the lower extension 136 of the second source 134. Again materials 21 and 22 moving in the direction of arrow 37, past the sources 134 and past anvil means 24, are welded along all points of their width.

FIG. 7 shows the preferred embodiment of this invention and reveals parallelogram sources 46. The parallelograms 46 are preferably of an angle of 30 degrees as shown in FIG. 7. Again the parallelogram sources 46 are arranged to overlap adjacent parallelograms 46 as shown and any material traveling in the direction of arrow 37 through sources 46 and anvil 34 would be welded along all points of its width.

Figure 9:
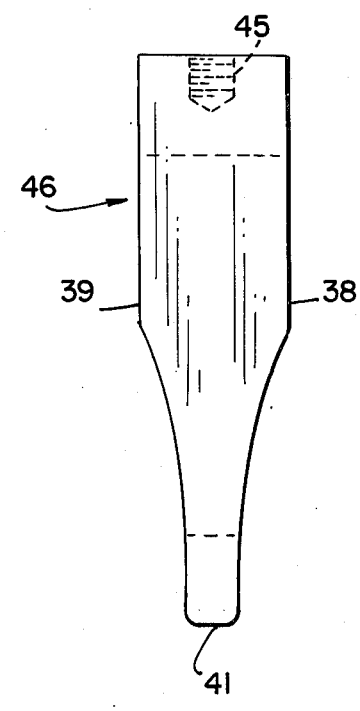
FIG. 9 shows a side view of a parallelogram source of FIG. 7.

FIGS. 8 and 9 show front and side views respectively of sources 46 of the embodiment shown in FIG. 7. FIG. 8 shows front edge 38 and back edge 39 with hollow portions 40, attachment fittings 45, and bottom face 41 of source 46. Bottom face 41 would be in contact with anvil means 24 at point 26 during the welding of material 21 and 22. Holes 40 are designed so that sources 46 vibrate at the proper frequency. As can be seen in FIG. 7 front edge 42 is located between opposing front edge 38 and rear edge 39 on a plane transverse to the flow of materials 21 and 22; thus any material such as materials 21 and 22 moving in direction of arrow 37 would be welded along all points of their width transverse to arrow 37. Attachment fitting 45 provide the attachment of the source 46 to the entire apparatus 20 and to the power source (unshown) which provides the power by which the sources 46 vibrate.

The present invention is not limited to the above embodiments. It is possible that materials 21 and 22 travel not perpendicular to but at an angle to the array of sources 25. In that event the sources could be rectangular as long as their spacing was such that they overlapped in the direction of the flow of material.

While the above examples and embodiments serve to describe and illustrate suitable and preferred embodiments in accordance with the present invention, it should be understood that various changes, omissions and substitutes to the preferred embodiments may be made by those skilled in the art, without departing from the scope of the present invention.

I claim:

1. In an apparatus for vibration welding of material comprising:
   (a) a plurality of ultrasonic vibration sources;
   (b) anvil means cooperating with said sources; and
   (c) means for transporting said material with respect to said sources and anvil means;

the improvement which comprises said sources being arranged in a linear array with the ends of said sources overlapping adjacent sources in the direction of movement of said material wherein said sources are alternating trapezoids with adjacent long and short ends and with opposing long ends overlapping in the direction of the movement of said material.

2. In an apparatus for vibration welding of material comprising:
   (a) a plurality of ultrasonic vibration sources;
   (b) anvil means cooperating with said sources; and
   (c) means for transporting said material with respect to said sources and anvil means;

the improvement which comprises said sources being arranged in a linear array with the ends of said sources overlapping adjacent sources in the direction of movement of said material wherein said sources are parallelograms and arranged in an array to overlap in the direction of the movement of said material.

* * * * *